United States Patent

[11] 3,550,855

[72] Inventors Sam H. Feld;
 Charles A. Buell; Gary C. Isaacson,
 Bellevue, Wash.
[21] Appl. No. 754,865
[22] Filed Aug. 23, 1968
[45] Patented Dec. 29, 1970
[73] Assignee The Boeing Company
 Seattle, Wash.
 a corporation of Delaware

[54] TARGET-TYPE THRUST REVERSER
 10 Claims, 6 Drawing Figs.
[52] U.S. Cl. .................................................. 239/265.29;
 60/230; 74/105
[51] Int. Cl. ..................................................... B64c 15/04
[50] Field of Search ........................................ 239/265.29,
 265.37; 74/105; 60/230

[56] References Cited
 UNITED STATES PATENTS
3,035,411 5/1962 Porowski ..................... 239/265.29
3,164,956 1/1965 Colebrook et al. ........... 239/265.29X
3,312,429 4/1967 Hull, Jr. et al. ............... 60/230X Primary Examiner—M. Henson Wood, Jr.
Assistant Examiner—Michael Y. Mar
Attorneys—Glenn Orlob, Bernard A. Donahue and Kenneth W. Thomas ABSTRACT: An apparatus for the reversal of jet engine thrust which comprises target-type deflector doors mounted on a single nontranslating pivot on a hollow main support beam. A load transferring sled is supported within the interior of the main beam on self-aligning runners for guided longitudinal travel. An actuator and door linkages are each attached to the sled within the interior of the main beam, at points arrayed such that the sled will react side loads directly into the main beam without tending to turn or bind during a symmetrical loading. The deflector door inner and outer surfaces are shaped to provide a continuation of existing aerodynamic contours and nacelle cooling passageways when the reverser is in the cruise flight position.

INVENTORS:
SAM H. FELD
CHARLES A. BUELL
GARY C. ISAACSON
BY
ATTORNEY

INVENTORS:
SAM H. FELD
CHARLES A. BUELL
BY GARY C. ISAACSON

ATTORNEY

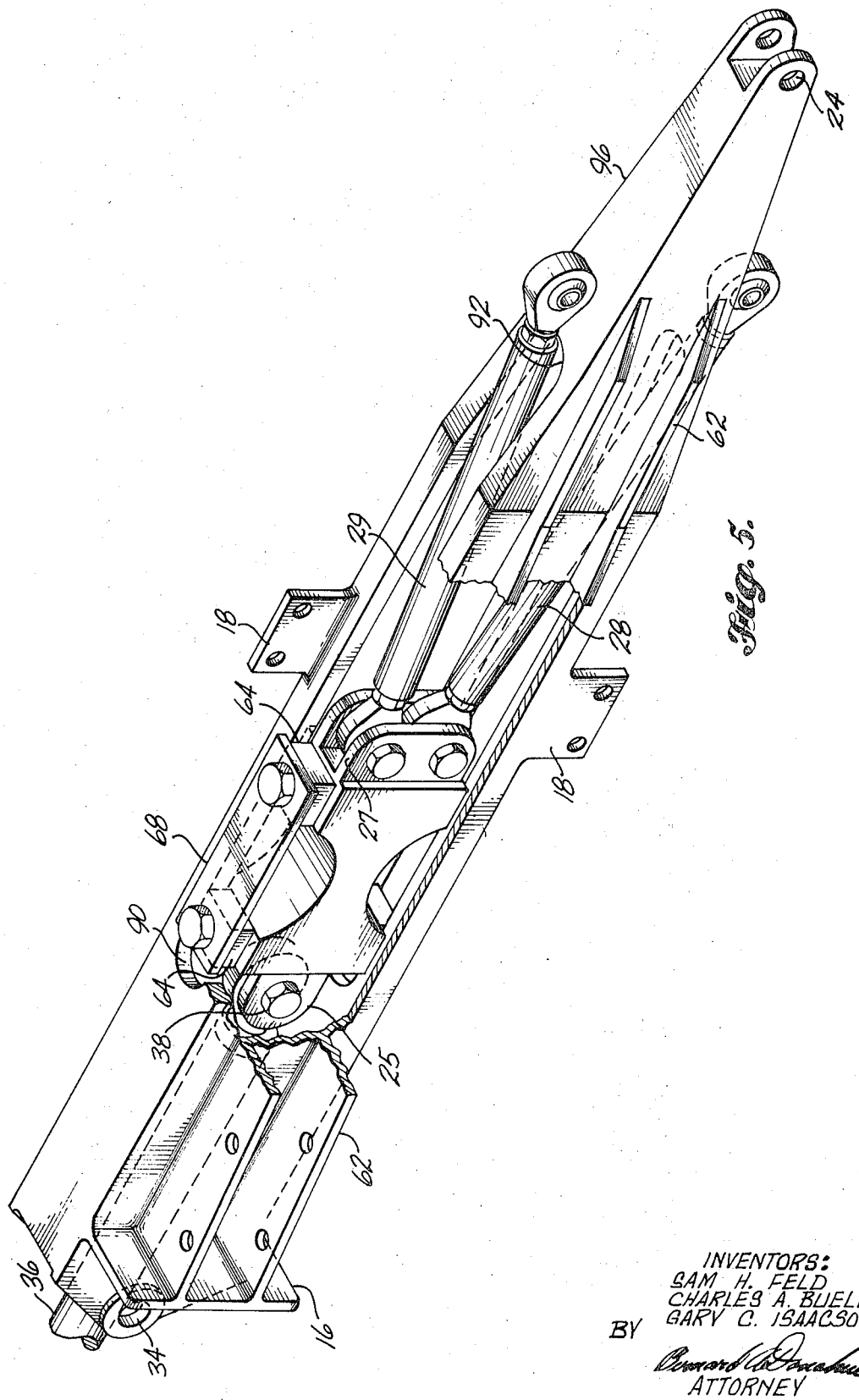

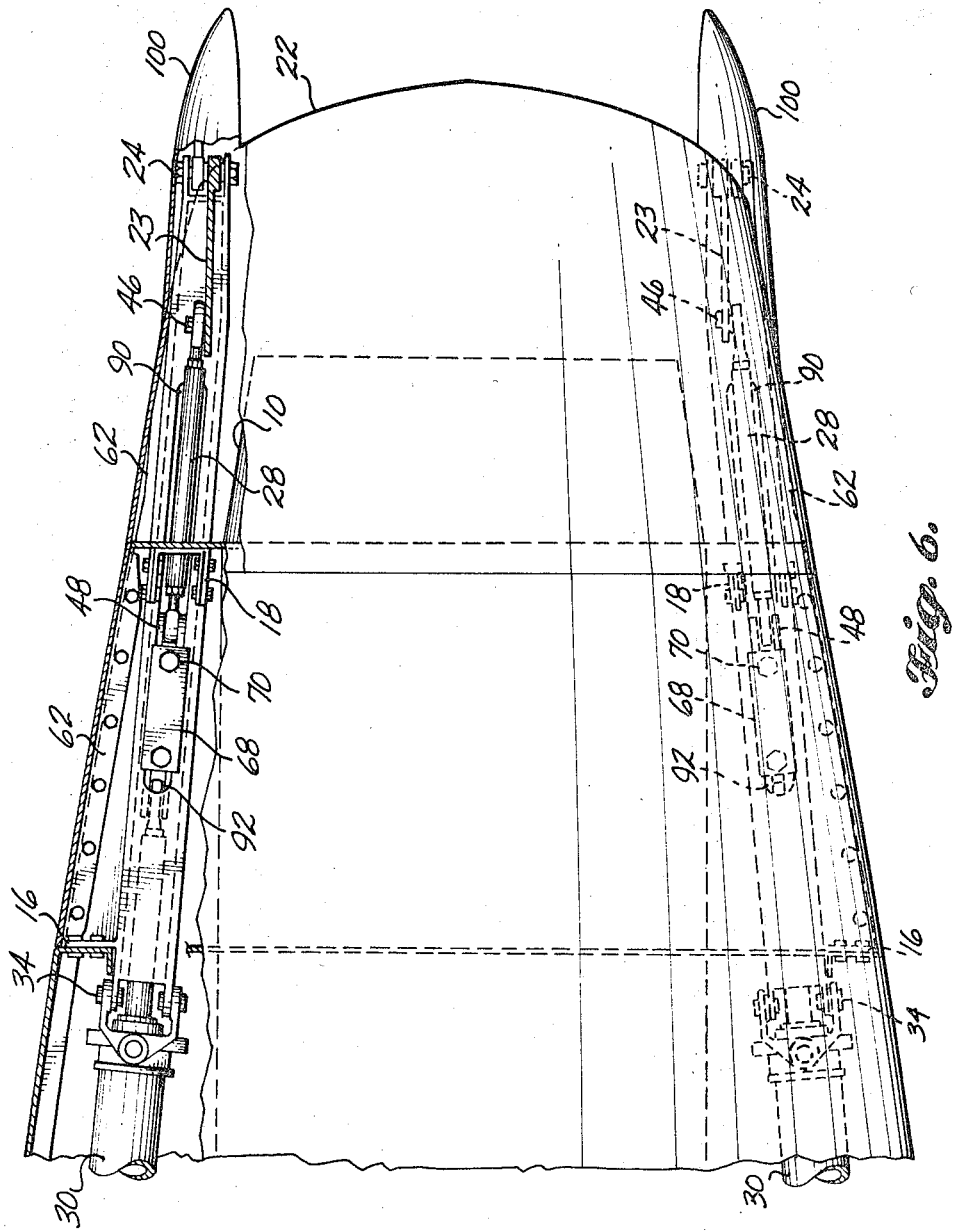

TARGET-TYPE THRUST REVERSER

BACKGROUND OF THE INVENTION

This invention relates to jet engine thrust reversers, more particularly to an improved target-type reverser system.

The reverser is particularly well adapted for use on small jet engines of the 3,000 pound thrust class in that it provides a reliable, economical, lightweight unit which is essentially self-contained and which may be readily installed on, and removed from the nacelle structure of aircraft presently in service.

In the past, cost, reliability, and weight factors have been responsible for the lack of inclusion of reverser mechanisms on small twin-jet aircraft such as those of the Jet Commander business jet class. It has long been recognized that a need exists for reverser mechanisms on this class of aircraft for short field landing and for generally increased safety on wet or iced runways. However, most prior systems have been considered unsatisfactory in that they have sacrificed structural rigidity and reliability for weight and cost considerations; or have achieved rigidity and reliability only through expensive and heavy components. Many systems which have been designed for small jet engines, utilize eccentric load paths in their actuating mechanism in order to overcome space limitations. Such eccentricities create bending and binding loads and cause wear within the mechanism.

Typical prior art systems employ push-pull rod linkages attached to reverser doors and to a T-shaped or multiflanged member which is driven longitudinally by an actuator and slidably supported over a central shaft. These shafts are of relatively small cross section and are therefore subject to distortion upon application of unbalanced reverser loads. The prior art T-shaped or multiflanged members have their load points located well outboard of their center lines of symmetry. Therefore, the loads tend to create large turning moments with respect to the member center line. These members are susceptible to binding, bending, and wearing, particularly when the door loads are initially unbalanced with respect to the center line of symmetry, as is often the case during landing conditions.

SUMMARY

The principal objective of this invention is to provide an improved target-type thrust reverser system that is compact, lightweight, economical to build and install, has greater structural rigidity than prior designs, and which minimizes eccentric load paths.

In order to achieve this objective, the present invention utilizes a hollow body main support beam which pivotally supports an actuator means and the reverser doors. An interconnecting sled means is mounted for longitudinal travel within the hollow body of the support beam. The sled is structurally connected to the actuator means and to the door linkages by bearings located on the sled, within the confines of the hollow beam, in close proximity to the center line of the sled.

Constructed in this manner, the system is virtually free of the excessive bending, binding and wearing loads of prior art mechanisms. The hollow-body cross section of the main beam inherently maximizes lateral and torsional rigidity for any given weight of beam. Additionally, the reverser doors have been configured such that their outer surfaces will form an aerodynamic continuation of the external nacelle contour. The inner surfaces of the door can be configured to cooperate with the tailpipe of the engine to form an ejector passageway when the reverser is stowed. The trailing edges of the door have been shaped to allow both doors to be pivoted from a single point on the main beam, thereby eliminating the cumbersome translation requirement of many prior systems. Double gimbal mounting of the actuator has been utilized to reduce transverse and eccentric loading on the sled. Rod linkages are used to interconnect the sled means and the door means and are arranged such that their respective lines of force will always intersect at a point within the sled body, thereby minimizing undesirable rotary binding moments on the sled.

The sled itself is supported for longitudinal travel on area-contact-type self-aligning runners which are mounted to the sled on spherical bearings, thereby minimizing any tendency to binding and allowing self-adjustment for wear. The entire unit is essentially self-contained and is easily installed on and removed from existing aircraft.

Accordingly, it is a related object of this invention to provide an economical, compact and structurally rigid thrust reverser mechanism which can be readily installed on existing aircraft and which provides means for maintaining existing aerodynamic contours and nacelle cooling and mixing passageways.

Another principal object of this invention is to provide an economical reverser mechanism for jet engines of the business jet class which will function reliably for a lifetime of the order of 5,000 cycles in a temperature environment of up to 1200° F.

Other and further objects of the invention will become apparent from the detailed description of the invention given in connection with the various figures of the drawings.

BRIEF DESCRIPTION OF THE DRAWINGS

FIG. 5 provides an expanded isometric cutaway view of the beam, sled, and actuator assembly.

FIG. 6 is a plan view of the reverser system in a stowed position.

DESCRIPTION OF THE PREFERRED EMBODIMENT

Figure 1:
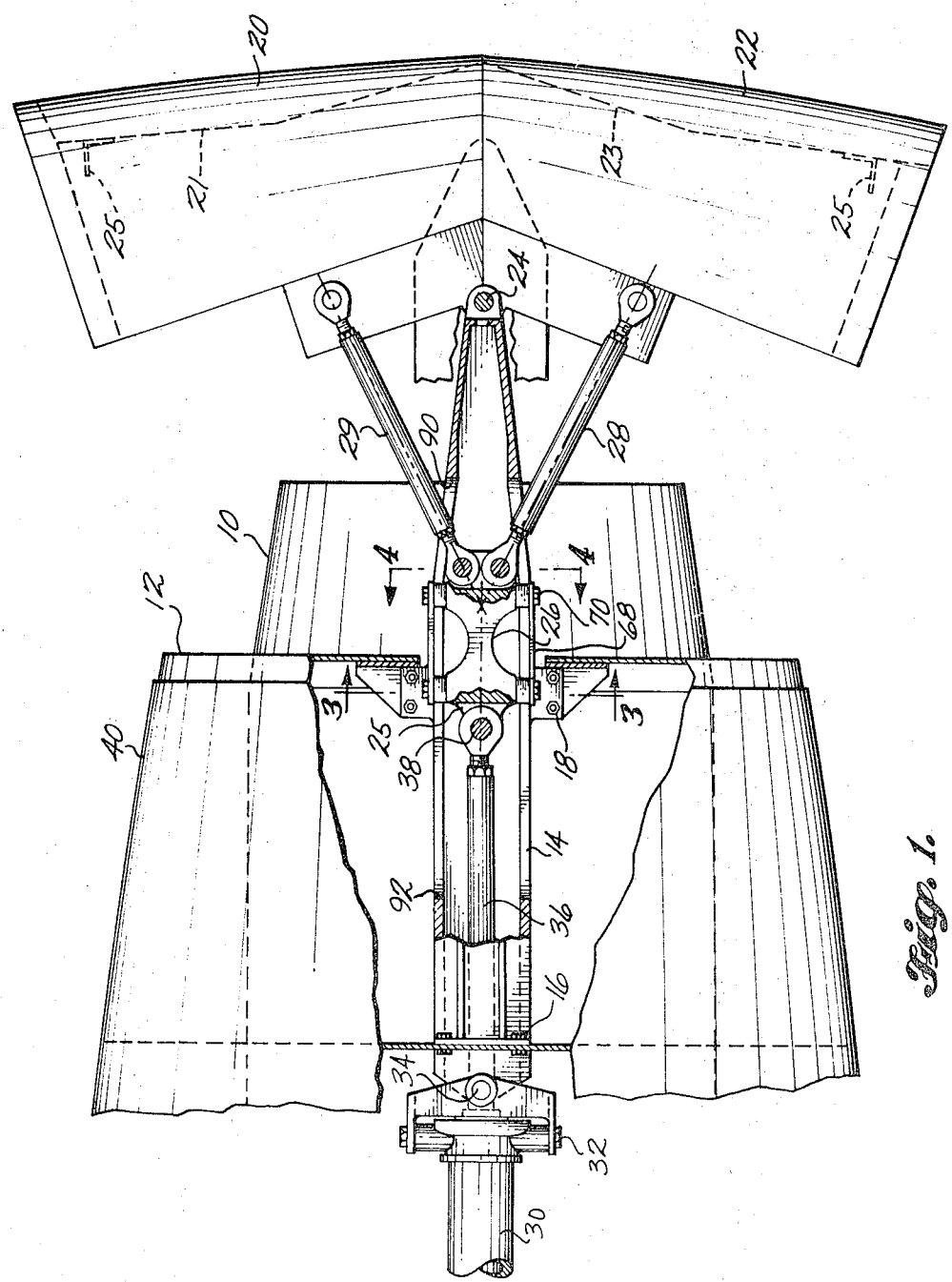
FIG. 1 is a side elevation view of a preferred embodiment showing the thrust reverser mechanism in a deployed position.

Referring to the drawings, the FIG. 1 side elevation view illustrates the tailpipe 10 of a jet engine with nacelle support structure shown generally at 12. A hollow main support beam 14 is attached to the nacelle structure through lug and bolt connections at 16 and 18. The deflector doors 20 and 22 are each pivotally mounted on beam 14 at point 24. A sled means 26 is mounted for longitudinal travel within hollow beam 14. The rods 28 and 29 interconnect the deflector doors and the sled means. The hydraulic actuator 30 is double-gimbal mounted to the beam 14 at 32 and 34. The actuator piston member 36 is pivotally attached to the forward end of the sled means at 38, directly on the longitudinal center line of symmetry of the system.

In operation, extension of the hydraulic actuator 30 will position the doors in the deployed position shown, and retraction of actuator 30 will move the doors back into a stowed position. In the deployed position, the doors 20, 22 reverse the flow of gases from tailpipe 10 by turning them along inside door faces 21, 23 and directing them generally vertically and forwardly to lip deflector 25 where the gases are again turned in a forward direction.

Figure 2:
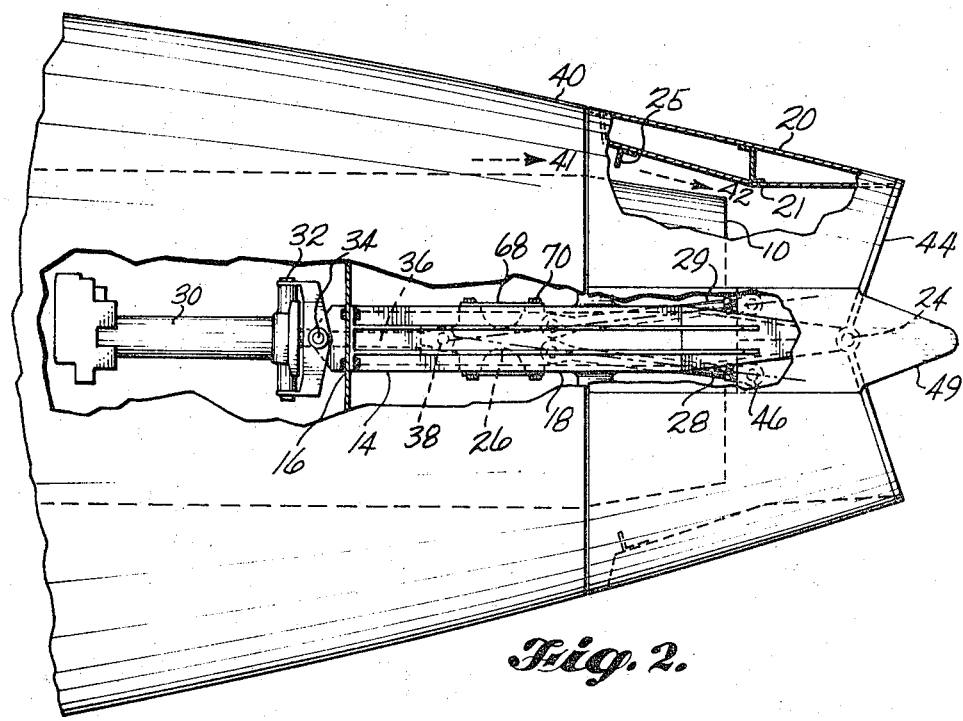
FIG. 2 is a cutaway side elevation of the reverser installation of FIG. 1 shown in a stowed, or cruise flight position.

FIG. 2 shows the reverser mechanism in the stowed position. The exterior of door 20 forms a continuous aerodynamic contour with nacelle skin structure 40. The interior surface of the door at 21 provides a continuation of the annular passageway 41, 42 which can be used to induce the flow of accessory cooling air and gases from the interior of the nacelle. The trailing edges of the doors are sloped inwardly as at 44 to bring them into abutting contact upon pivoting about point 24 into position for the reverse thrust mode.

The actuator 30 is supported solely by the mutually perpendicular double gimbal system 32, 34 on the forward end of beam 14. The double gimbal mounting effectively precludes transmission of transverse loadings from the actuator through the piston member 36 to the sled at 38.

The two-force rod members 28, 29 are attached to the door structure and to the sled by spherical bearings at 46 and 48 respectively. Note that lines of force drawn through the center lines of rods 28 and 29 will intersect at the sled center line, within the sled body, just aft of the actuator attach point 38. Referring back to FIG. 1, when the sled 26 is in its other extreme position of travel, the rod lines of force will intersect within the sled body just forward of the rod attach points. Therefore, for any position of travel, the transverse components of the door loads can be reacted directly through the sled and into beam 14 without a requirement for a moment or couple reaction of the type which has caused binding and wear in prior systems. This optimization of the sled force transfer system has been made possible by Applicants' unique hollow-body construction wherein the sled member and all attach points thereto are confined within the hollow body in close proximity to the longitudinal center line of the support beam.

Figure 3:
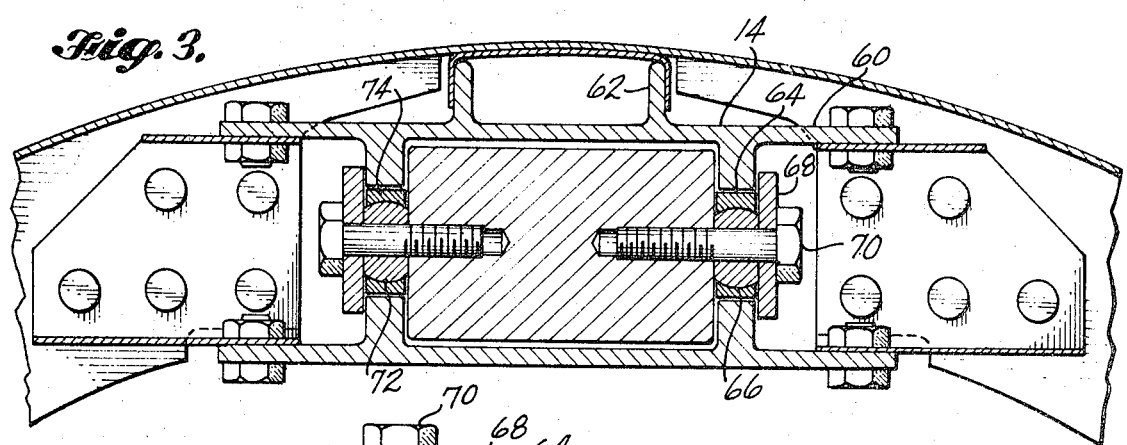
FIG. 3 is a sectional view taken at 3—3 in FIG. 1.

FIG. 3 is a cross section through hollow main support beam 14 taken at 3-3 in FIG. 1. FIG. 3 illustrates the configuration of hollow body beam 14, lateral attachment lugs 60, reinforcing and shear attachment ribs 62, and the sled support means 64. The overall shape of the hollow beam 14 and its cooperation with the sled and actuator systems will be discussed more fully in connection with the FIG. 5 isometric. Referring again to FIG. 3, the sled 26 is shown to be supported for longitudinal travel on runner blocks 64 which are mounted on spherical bearings 66. The bearings 66 are rigidly held between the body of sled 26 and retainer plates 68 by bolts 70. Installed in this fashion, the runner blocks 64 are free to rotate with respect to sled 26, into aligned area contact with contact surfaces 72, 74 of the longitudinal slot through the exterior wall of beam 14. The runners are preferably of generally square or rectangular shape and constructed of an aluminum-nickel-boron alloy.

The retainer plates 68 are seen to cooperate with the exterior wall surface of beam 14 to provide a sliding contact interface for reacting lateral loads on the sled. It should be noted that a modified form of combined runner and retainer plate may be used whereby individual retainer surfaces are machined on each runner member 66. Such surfaces may be conveniently machined from an outer race member of the type often sold with spherical bearings. With this modification, the retainer plates are free to rotate on the bearings 66 and therefore the retainer surfaces will tend to be self-aligning with respect to the contact surfaces on the beam 14. All contact surfaces should be hardened for maximum wear lifetime.

Figure 4:
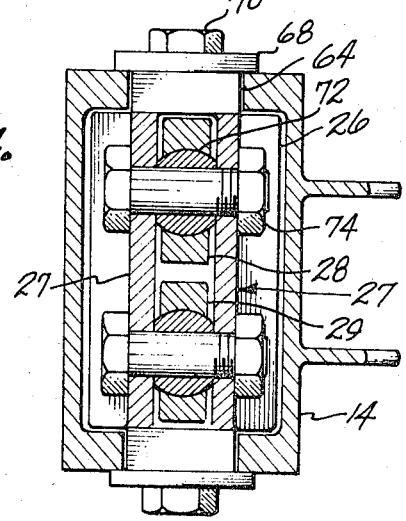
FIG. 4 is a sectional view taken at 4—4 in FIG. 1.

FIG. 4 provides a showing of the cross section of beam 14 and the attachment lug means 27 of sled 26, taken through location 4-4 in FIG. 1. Rod members 28 and 29 are shown to be pivotally mounted on spherical bearings captured between lugs 27 of sled 26 and held in that position by the nut and bolt combination shown at 74.

FIG. 5 is an isometric presentation of the entire main support beam assembly. The sled 26 is shown in its forwardmost position, corresponding to the cruise flight or stowed position, of the reverser. The self-aligning runner blocks 64 are in nesting engagement with the exterior wall of beam 14 along the longitudinal guide slot running from 90 to 92. Rod means 28, 29 extend through the aft extension of slots 90, 92 for attachment to the reverser doors (not shown) which are pivotally mounted about point 24.

The compactness, rigidity and directness of loads paths of the actuating mechanism are here clearly illustrated. The primary lateral attachment lugs are depicted at 16 and 18. The longitudinal shear attachment and stiffening ribs 62 can be seen to extend from the forward attachment lug face 16 along the length of the beam until well past the termination of the longitudinal guide slots 90, 92. When the beam 14 is configured in this manner, it may be conveniently precision cast of a quality alloy such as 17-4 pH stainless steel, thereby minimizing machining operations.

FIG. 6 is a plan view, partly in section, of an engine and nacelle structure incorporating the present invention. The reverser assembly is seen to be rigidly attached to the nacelle frame rings at 16 and 18. Longitudinal shear attachments are made through flange 62 into conventional intercostal structure between the nacelle frame rings. It will be readily understood that the entire assembly may be rapidly detached from the nacelle by removal of the fasteners at 16 and 18 and through flange 62. A bullet fairing 100 covers the door pivot joint 24 for aerodynamic smoothing purposes.

While a particular embodiment of the invention has been shown and described, modification will be apparent to those skilled in the art without departing from the spirit and scope of the invention. For example, while a target-type reverser system has been illustrated, it will be apparent that portions of the disclosed apparatus can be used in combination with other selectively positionable systems.

We claim:

1. In combination with the tailpipe and nacelle structure of a jet engine, a thrust reverser mechanism comprising:
   an elongated hollow main support beam comprising a wall portion which defines a longitudinal slot communicating between the interior and the exterior of said beam;
   deflector door means for reversing the flow of engine exhaust gases;
   sled means supported within said hollow main support beam for longitudinal travel therein;
   runner means pivotally mounted on said sled means and cooperating with said slot to establish a predetermined path for the motion of said sled means;
   rod means interconnecting said deflector door means and said sled means;
   wherein said rod means is connected to said sled means within the interior of said hollow main support beam; and
   actuator means operably connected to said sled means for selectively positioning said sled means within said hollow main support beam.

2. The mechanism of claim 1 wherein said actuator means is pivotally mounted on said main beam and pivotally attached to said sled means within the interior of said hollow main support beam.

3. The mechanism of claim 1 wherein said deflector door means includes an outer surface which forms a portion of the exterior surface of said nacelle structure when said door means is positioned for cruise flight, and an inner surface which acts to reverse the flow of engine exhaust when said door means is positioned for reverse thrust operation.

4. An aircraft thrust reverser mechanism comprising:
   an elongated hollow main support beam which includes opposing longitudinally extending wall portions and means for securing said beam to the internal structure of said aircraft;
   sled means supported within said hollow main support beam for longitudinal travel therein;
   guidance means carried by said wall portions;
   runner means carried by said sled means and cooperating with said guidance means to establish a predetermined path for said longitudinal travel;
   interconnecting means for transferring forces between said door means and said sled means and for directing the forces along lines passing through the longitudinal center line of said sled means for all positions of travel of said sled means; and
   actuator means operably connected to said sled means for selectively positioning said sled means and said deflector door means between stowed and deployed positions.

5. The mechanism of claim 4 wherein said guidance means comprises a longitudinal slot and said runner means includes a self-aligning bearings for maintaining said runner means in aligned contact with said longitudinal slot.

6. The mechanism of claim 4 wherein each of said deflector door means and said actuator means are pivotally mounted on said main support beam.

7. The mechanism of claim 4 wherein said means for securing said beam to the internal structure of said aircraft includes flanges carried by said beam and arranged for connection to the internal frame structure of said aircraft.

8. The mechanism of claim 7 wherein said beam includes longitudinally aligned flange members for increasing the stiffness of said beam and for providing means for attaching said beam to intercostal structure installed between major members of said internal frame structure for the purpose of reacting longitudinal loads imparted to said beam.

9. In combination with the tailpipe and nacelle structure of a jet engine, a thrust reverser mechanism comprising:
   a hollow main support beam;
   deflector door means for reversing the flow of engine exhaust gases, said door means being pivotally mounted on said main support beam;
   sled means supported within said hollow main support beam for longitudinal travel therein;
   interconnecting means for transferring forces between said door means and said sled means and for directing the forces along lines passing through the longitudinal center line of said sled means for all positions of travel of said sled means; and
   actuator means operably connected to said sled means for selectively positioning said sled means and said deflector door means between stowed and deployed positions, wherein said deflector door means comprises outer surface means which cooperates with the exterior of said nacelle structure to provide a substantially continuous aerodynamic contour when said door means is positioned in said stowed position, and inner surface means for reversing the flow of engine exhaust when said door means is in the deployed position, and which in the stowed position extends substantially aft of said tailpipe exit plane and cooperates with said nacelle structure and said tailpipe to form a passageway for the flow of air and gases out of the interior of said nacelle structure.

10. In combination with the tailpipe and nacelle structure of a jet engine, a thrust reverser mechanism comprising:
    a hollow main support beam;
    deflector door means for reversing the flow of engine exhaust gases, said door means being pivotally mounted on said main support beam;
    sled means supported within said hollow main support beam for longitudinal travel therein;
    interconnecting means for transferring forces between said door means and said sled means and for directing the forces along lines passing through the longitudinal center line of said sled means for all positions of travel of said sled means; and
    actuator means operably connected to said sled means for selectively positioning said sled means and said deflector door means between stowed and deployed positions, wherein said actuator means is gimbal mounted on said beam in each of two substantially mutually perpendicular planes and said actuator means includes a hydraulic piston rod means extending into the interior of said beam and pivotally attached to said sled means.